United States Patent
Yarm

[15] 3,670,852
[45] June 20, 1972

[54] FRANGIBLE TENSION SHOCK ABSORBER

[72] Inventor: Jay Martin Yarm, Milford, Conn.

[73] Assignee: United Aircraft Corporation, East Hartford, Conn.

[22] Filed: Feb. 18, 1971

[21] Appl. No.: 116,323

[52] U.S. Cl. ............................................... 188/1 C, 74/492
[51] Int. Cl. ........................................................... F16f 7/12
[58] Field of Search ............................... 74/492, 493; 188/1 C

[56] References Cited

UNITED STATES PATENTS

| 2,682,931 | 7/1954 | Young | 188/1 C |
| 3,398,812 | 8/1968 | Peterson | 188/1 C |

*Primary Examiner*—Duane A. Reger
*Attorney*—Maurice B. Tasker and Vernon Fhauschild

[57] ABSTRACT

A tension shock absorber comprises a length of music wire, one end of which is passed through a hole in an anvil the diameter of which conforms closely to the diameter of the wire. The portion of the wire which has not passed through the anvil is plated with a frangible metal. Excessive tension forces applied to the unplated end of the wire cause the anvil to peel the plating from the wire. A fixed sleeve closely surrounding the plated portion of the wire a short distance from the face of the anvil prevents premature propagation of peeling.

16 Claims, 5 Drawing Figures

PATENTED JUN 20 1972　　3,670,852
FIG.1　　FIG.2
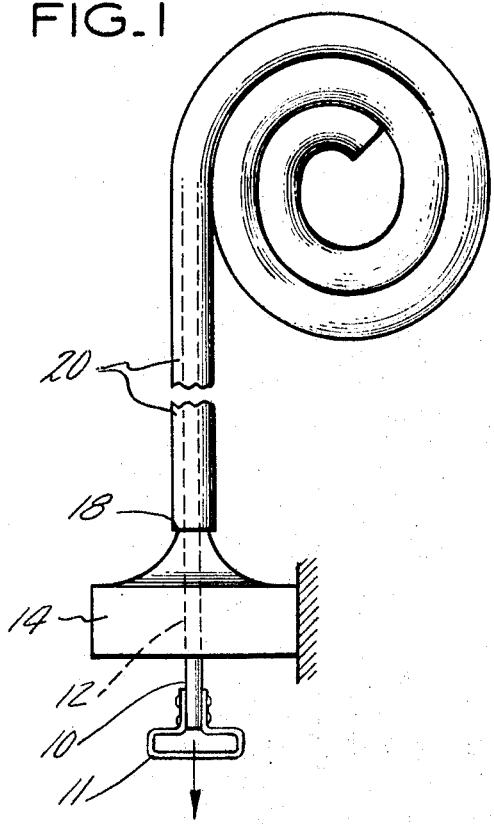
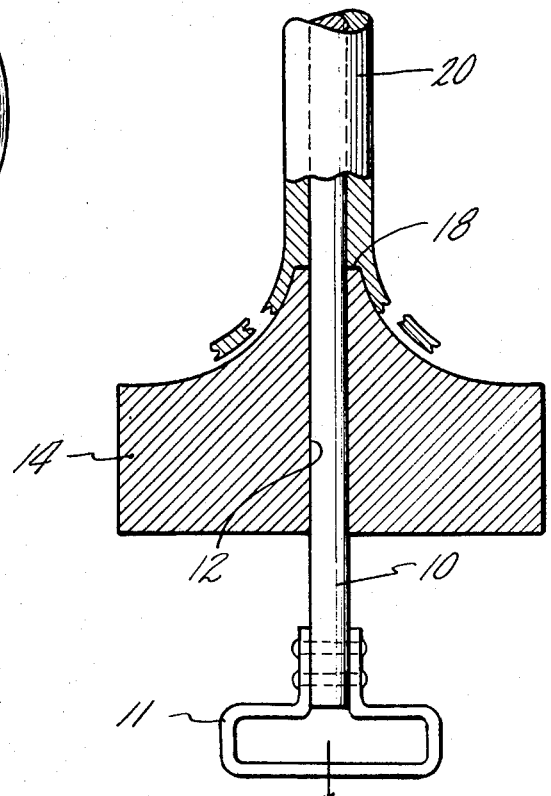
FIG.5　　FIG.3　　FIG.4
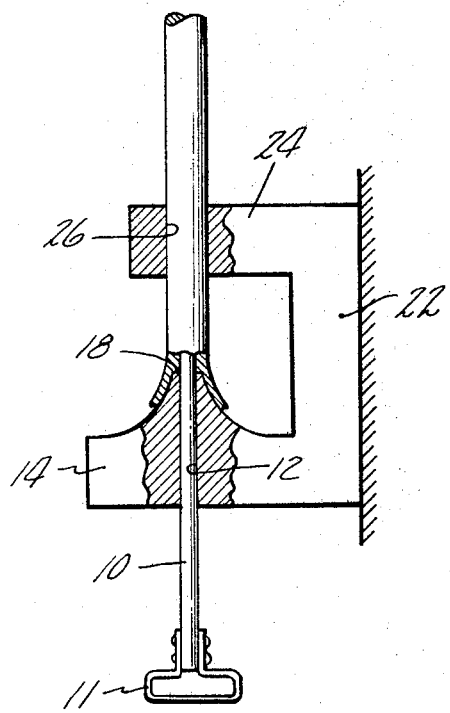
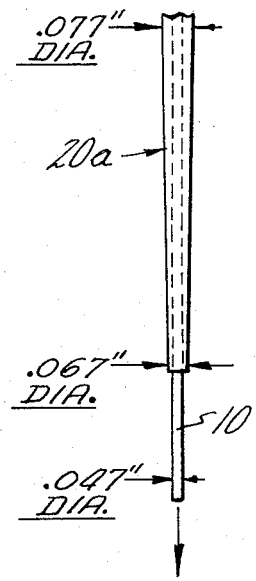
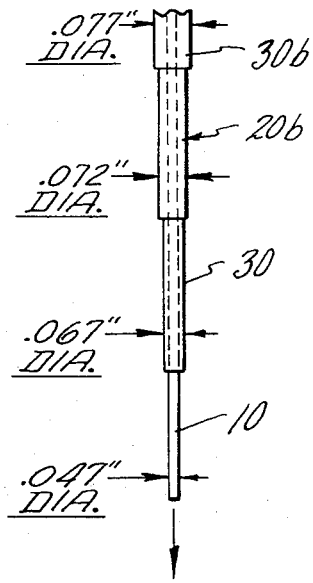
INVENTOR
JAY MARTIN YARM
BY M.B. Tasker
ATTORNEY

FRANGIBLE TENSION SHOCK ABSORBER

CROSS-REFERENCE TO RELATED APPLICATIONS

An application of Jay M. Yarm and Edmond F. Kelly, Ser. No. 879,666, filed Nov. 25, 1969 and assigned to the assignee of the present application, discloses a wire or rod member having a plated-on retention means which is enclosed in a counterbore to prevent stripping. This application contains information pertinent to the practice of the present invention and reference is made thereto as supplementing the disclosure of this application.

BACKGROUND OF THE INVENTION

1. Field of the Invention

This invention relates to a tension shock absorber utilizing a length of plated wire and an anvil for stripping the plating from the wire. One use for this device, for example, is in connection with cables used for stopping aircraft as they land on a carrier deck. It is also well suited for use with automobile and aircraft seat restraints where a shock absorber free from elastic rebound is of utmost importance.

2. Description of the Prior Art

Frangible materials such as balsa and honeycomb or tubing forced over an anvil have been used where extreme energy absorption by compression is desired for a one-time use. Tension shock absorbers utilizing the principle of material deformation have also been used. U.S. Pat. No. 2,682,931, issued July 6, 1954 to V. M. Young shows a malleable rod which is deformed by being drawn through a diameter reducing die to provide such a non-elastic energy absorbing device. U. S. Pat. No. 3,026,972, issued Mar. 27, 1962 to G. Hendry et al. shows a metal tube of circular cross-section and a mandrel of generally square cross-section located at one end of the tube which is drawn through the tube and deforms it to provide similar energy dissipation.

Others have proposed energy absorbers by plastic deformation (material deformed beyond yield point) of steel members in tension. All of these devices have been difficult to produce and expensive, because to get predictable results the material had to be manufactured with great precision. Slight variations in the composition of the metal used or impurities in the metal could result in wide variations in the work (force $x$ distance) which the device is capable of doing. Consequently they have not gone into general use.

SUMMARY OF THE INVENTION

A principal object of this invention is to provide a tensile shock absorbing device which is simple and easy to manufacture and one which in performance is much more predictable than prior shock absorbers.

In accordance with this invention a precisely dimensioned wire which is already available on the market has an accurately dimensioned metallic coating formed thereon by means of a plating process, such a an electrochemical plating process. The plated wire is drawn through a passage in a suitable anvil in which the passage closely conforms to the diameter of the uncoated wire. When an abnormal force in tension is applied to the uncoated end of the wire, the coated portion of the wire is drawn through the anvil which results in stripping the coating from the wire and in so doing performs work which opposes the applied force.

Multiple strands can be used if higher tension loads are involved. Also the work that the absorber is capable of performing can be varied by choice of wire diameter. Further the thickness of the plating can be varied to obtain variations in work performance. It is also possible to vary the thickness of the coating along the length of the wire either uniformly or in steps to obtain varying loads as the wire is drawn through the anvil.

Another object of this invention is to provide a tensile shock absorber of this type in which the core wire is of a high tensile strength metal and the integral coating is of a different metal which has very different characteristics from those of the wire.

A further object of this invention is the provision of a shock absorbing device having a coated wire in which the coating is applied without the use of excessive heat which would alter the tensile characteristics of the wire.

A still further object of this invention is to provide a method of making a tensile shock absorber in which a coating of frangible metal is applied to a length of high tensile strength wire by an electrochemical plating process to produce an integral structure.

A still further object of this invention is generally to improve the construction and performance of tensile shock absorbers.

BRIEF DESCRIPTION OF THE DRAWINGS

FIG. 1 is a side elevation of a tensile shock absorber of this invention;

FIG. 2 is an enlarged sectional view of the shock absorber of FIG. 1 in operation;

FIGS. 3 and 4 are details of the core wire, showing modified coatings; and

FIG. 5 is a side elevation, partly in section, showing a sleeve associated with the form of FIGS. 1 and 2 to prevent premature propagation of peeling.

DESCRIPTION OF THE PREFERRED EMBODIMENT

FIG. 1 shows the tensile shock absorber of this invention in its normal position, ready to operate upon occurrence of an abnormal shock load applied to wire 10 in the direction of the arrow. An unyielding linkage means, or fitting, 11 on the end of wire 10 serves to connect the end of the wire to the member which it is desired to decelerate upon a sudden, severe impact. Wire 10 extends through a passage 12 in a fixed anvil 14 and may be of considerable length to obtain long output displacements. For convenience it may be arranged in a coil 16 as shown in this figure.

Anvil 14 has an annular face 18 through the center of which passage 12 extends. This face 18 is usually slightly smaller in diameter than the diameter of a metallic coating 20 which is applied to a substantial length of wire 10 above face 18.

In accordance with this invention, coating 20 is applied by a suitable electrochemical plating process by which the desired thickness of the coating can be deposited onto the wire very accurately and very uniformly along its length as an integral part of the wire itself. Wire 10 may be music, or piano, wire which has high tensile strength and accurate diameter and is readily available in continuous length. Coating 20 may be nickel or chrome. When music wire is used with a nickel coating, the nickel-sulfamate plating process gives good results and is recommended. In this process the portion of the wire to be plated is immersed in the chemical solution of the nickel-sulfamate plating tank and as an electrical circuit is completed through the nickel and the associated plating bath, nickel will be deposited upon the immersed portion of the wire. For a more complete description of the nickel-sulfamate plating process reference is made to "Metals Handbook, 8th Edition, Volume 2, Heat Treating, Cleaning and Finishing," published by American Society for Metals, pp. 432–433.

The advantage of applying coating 20 by electrochemical plating is twofold. It results in a coating which is integral with the wire and one which is accurate as to thickness along the entire length of the coated portion of the wire. Also there is no danger of altering the tensile characteristics of the wire because it is essentially a cold process. Also, a much desired uniformity of the plated-on metal itself results which insures reliability of the results in operation. For applications where a less stringent adherence of the plating is required, the immersion or vacuum plating process could be utilized. The flame plating process provides good adherence, but is not preferred due to its tendency to alter the metal core characteristics.

The metal of the coating is frangible but if it is desired to get a more accurately controlled action a malleable metal such as copper can be added. Music wire, which is steel, has a high tensile strength and is particularly suitable for the purpose of this invention because it is readily available in diameters from one-quarter inch to very fine wire. For use in such applications as vehicle seat restraints, the core wire may be 0.047 inch in diameter, and the thickness of the coating may be 0.010 inch of nickel or chrome, or chrome may be plated over nickel or copper. Alloys such as zinc-copper, tin-cadmium, tin-lead, or cobalt-nickel may also be used. Music wire of 0.047 inch diameter has a breaking strength in tension of 477 pounds. Of course the peeling resistance of coating 20 should always be less than the tensile strength of the core which insures that the wire will never break.

To prevent premature propagation of peeling of coating 20, anvil 14 may have an upstanding post 22 carrying a shelf 24 which is spaced above and overlies the anvil face 18 and is provided with an aperture 26 which is axially aligned with passage 12 and has a diameter equal to the coated diameter of the wire.

In FIG. 3 a modified coating 20a has been shown for core wire 10 in which the diameter of the coating is uniformly increased beginning at the uncoated portion adjacent anvil face 18.

In FIG. 4 still another modified coating 20b has been shown for wire 10 in which the diameter of the coating is increased by steps producing lands 30, 30a and 30b of increasing diameters. Either the FIG. 3 or the FIG. 4 construction can be easily produced by the electrochemical plating process, by a continuous and gradual withdrawal of the wire from the plating bath in the case of FIG. 3 and by an intermittent step-by-step withdrawal in the case of FIG. 4.

OPERATION

Normally the uncoated portion of wire 10 is drawn through passage 12 in anvil 14 so the coated portion 20 of the wire rests upon anvil face 18 as shown in FIG. 1. Fitting 11 is then attached to the end of the wire 10 by means of which the seat restraining belt or other device is attached. If a tension force is applied to wire 10 in the direction of the arrow in FIG. 1 which exceeds the designed resistance of coating 20, the coating will peel progressively from the wire as illustrated in FIG. 2. In this figure peeling of the coating is illustrated as a progressive fracture of the coating which will be the case if a frangible metal such as nickel or chromium is used for coating 20. If a malleable metal such as copper is used, a uniform rate peeling will take place without intermittent fracture of the coating material. In any case, the core wire 10 is never deformed in any way during the operation of this shock absorber.

If the nature of the coating 20 is such that the propagation of the peeling action extends too far above the face 18 of anvil 14, shelf 24 shown in FIG. 3 can be provided which establishes a limited peeling zone between the anvil face and the bottom surface of the shelf which results in a steady work load for the device during the entire operation. This shelf feature is only applicable to the FIGS. 1 and 2 form in which the coating 20 is of uniform diameter along the length of the wire.

An important feature of this invention resides in the face that the core wire 10 is not excessively heated in the plating process nor is it ever in operation deformed in any way. The only metal which undergoes deformation is the plated-on coating. Since this coating is applied by electrochemical plating process it can be very accurately controlled entirely independently of the characteristics of core wire 10.

It will be evident that, while wire of round cross-section has been shown and referred to throughout as the tension member of the shock absorber, the core section can have any desired cross section, although round wire is preferred since its diameter can be closely controlled with ease as well as the diameters of the passages 12 and 26.

I wish it to be understood that I do not desire to be limited to the exact details of construction shown and described, for obvious modifications will occur to a person skilled in the art.

I claim:

1. A tensile shock absorber including a metal wire of high tensile strength having an integral metallic coating on a portion of its length, an anvil having a passage therethrough which conforms in diameter to the diameter of the uncoated wire and through which the uncoated portion of the wire can be freely drawn, and a fitting secured to the uncoated end of said wire for attachment of a device to be decelerated upon sudden impact.

2. The shock absorber of claim 1 in which the coating on the metal wire is a frangible metal.

3. The shock absorber of claim 1 in which the coating on the metal wire is applied by an electrochemical plating process.

4. The shock absorber of claim 1 in which the high tensile wire is music wire and the coating is nickel applied by the nickel-sulfamate plating process.

5. The shock absorber of claim 1 in which a fixed sleeve is located in spaced relation to the anvil having a passage therethrough which conforms closely to the diameter of the wire coating.

6. A tensile shock absorber including a metal wire of high tensile strength, a coating of frangible metal applied to a portion of said wire by an electrochemical plating process, an anvil having a face and a passage extending from said face through said anvil which closely conforms in diameter to the diameter of the uncoated portion of said wire and through which said wire extends with the coated portion of said wire abutting the face of said anvil, and a fitting attached to the end of said uncoated portion on the side of said anvil remote from said face.

7. The shock absorber of claim 6 in which the frangible coating is nickel and the metal wire is high tension steel wire.

8. The shock absorber of claim 6 in which the anvil face is circular and has a diameter smaller than the diameter of the coating on said wire.

9. The shock absorber of claim 6 in which the anvil has an upstanding support at one side of the wire passage therethrough which carries a shelf which extends over said passage in spaced relation to said anvil and itself has a passage axially aligned with the passage in said anvil, the passage in said shelf having a diameter which closely conforms to the diameter of the coated wire.

10. In a frangible tension shock absorber, an elongated nondeformable metallic core member having a uniform diameter throughout its length, an anvil having a face of limited area, means for passing said core member through said anvil including a passage extending from said face through said anvil, an attachment type fitting secured to the free end of said core member by which the latter can be drawn through said anvil, and means for normally securing said core member against such passage and yielding only upon sudden impact comprising an annular plated-on coating of frangible metal on said member, one end of which rests upon said face.

11. The shock absorber of claim 10 in which the face of the anvil is annular and has a diameter less than the diameter of said coating.

12. In a frangible tension shock absorber, a nondeformable hardened steel wire of substantial length having a uniform diameter throughout its length, an anvil having an annular face of limited area, means for passing said wire freely through said anvil including a passage extending from said face through said anvil, said passage having the same diameter as said wire, an attachment type fitting secured to the free end of said wire on the side of said anvil remote from said face by which the wire can be drawn through said anvil, and means for normally securing said wire against such passage and yielding only upon sudden impact comprising an annular metallic coating of nickel on said wire, one end of which rests upon and overlies said face.

13. The shock absorber of claim 12 in which the anvil has an upright frame including a shelf which overlies the face of the anvil and is spaced above said face, said shelf having a passage therethrough which is aligned with the passage through said anvil and said shelf passage having a diameter substantially equal to the diameter of the plated wire and through which the latter can pass freely.

14. In a frangible tension shock absorber, a nondeformable high tension core wire of uniform diameter throughout its length having an integral metallic plated-on coating on a portion of its length, the thickness of said coating being progressively increased along the coated portion of said wire, an anvil having a face, means for passing the uncoated portion of said wire freely through said anvil comprising a passage extending from said anvil face through said anvil, said passage having a diameter equal to the diameter of said core wire, and an attachment type fitting secured to the uncoated free end of said core wire for attachment of a device to be decelerated upon sudden impact.

15. The shock absorber of claim 14 in which the thickness of the metallic coating on the core wire is increased uniformly along the coated portion of the wire.

16. The shock absorber of claim 14 in which the thickness of the metallic coating is increased by a series of steps producing lands of progressively increasing diameter.

* * * * *